Dec. 17, 1968  B. R. ELLIS  3,416,575
STATOR COILER
Filed Aug. 9, 1966  4 Sheets-Sheet 1
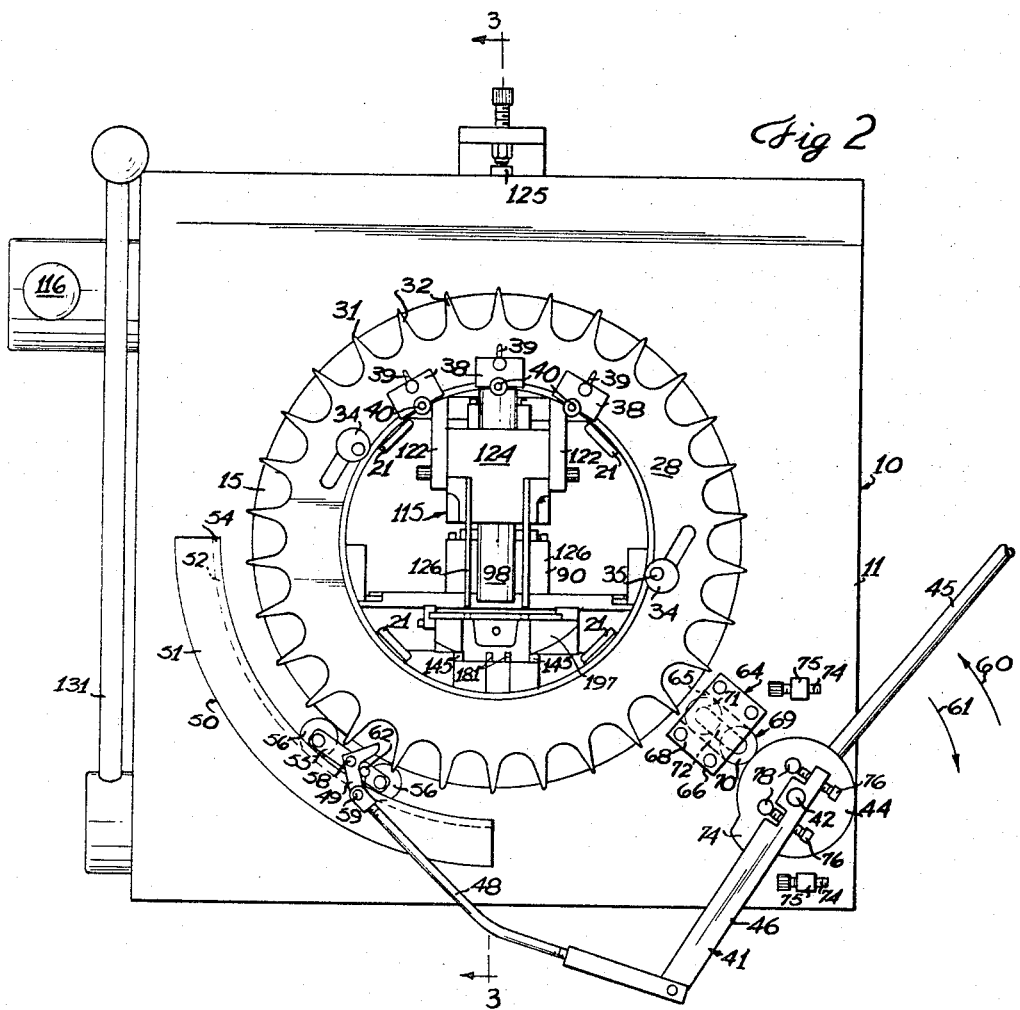
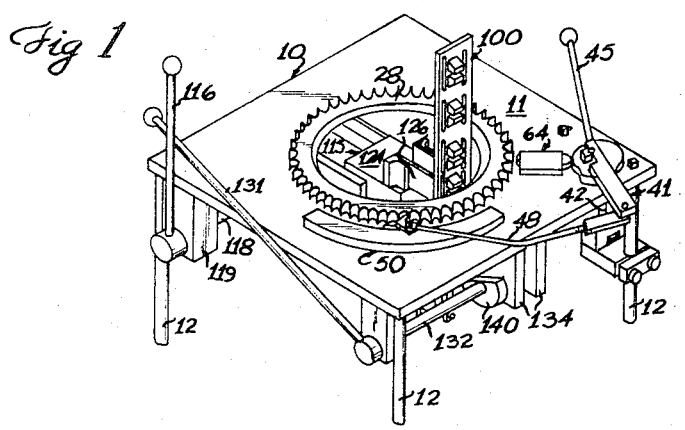
INVENTOR
Bobby R. Ellis
Newton, Hopkins,
Jones & Ormsby
ATTORNEYS Dec. 17, 1968  B. R. ELLIS  3,416,575
STATOR COILER
Filed Aug. 9, 1966  4 Sheets-Sheet 2
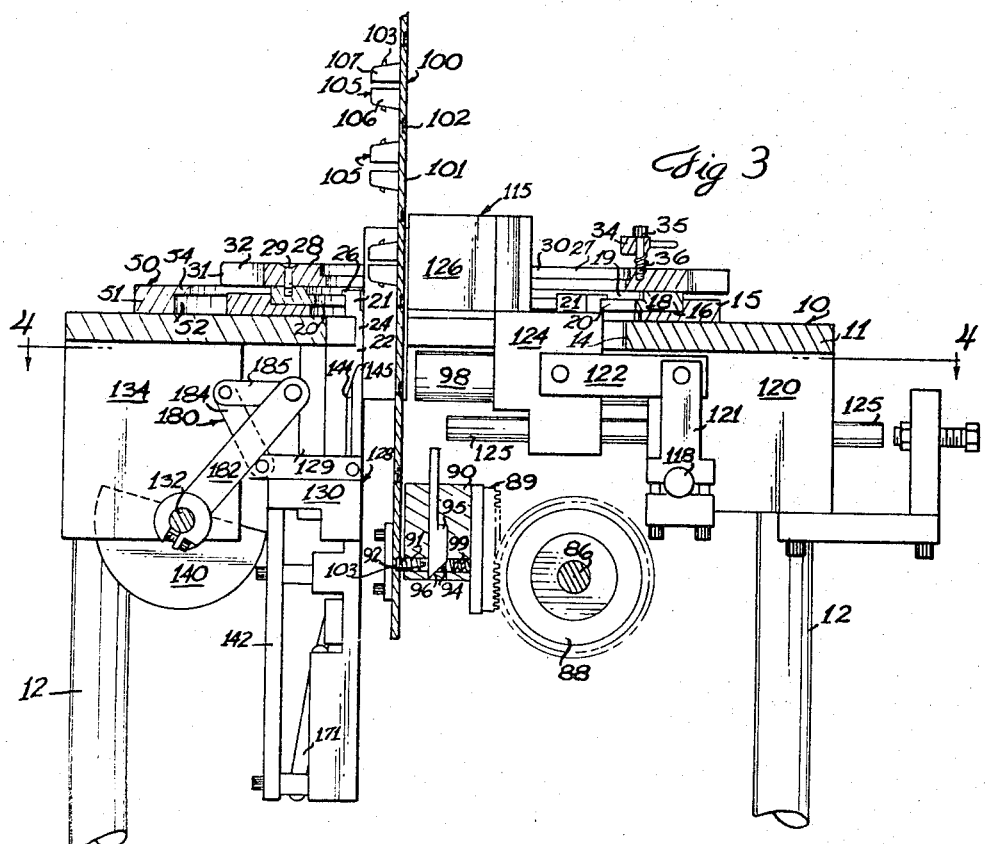
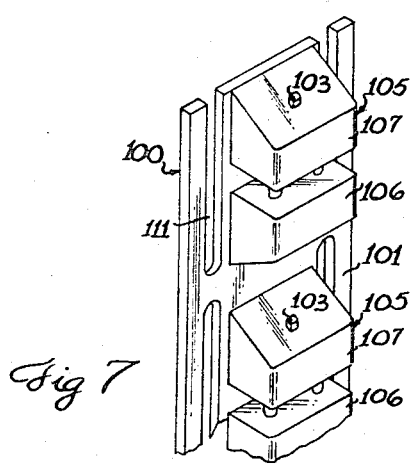
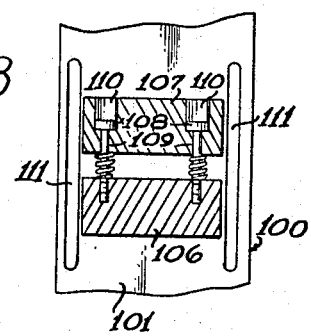
INVENTOR
Bobby R. Ellis
Newton, Hopkins,
Jones & Ormsby
ATTORNEYS INVENTOR
Bobby R. Ellis Newton, Hopkins,
Jones & Ormsby

ATTORNEYS

Dec. 17, 1968          B. R. ELLIS          3,416,575
                     STATOR COILER
Filed Aug. 9, 1966                    4 Sheets-Sheet 4
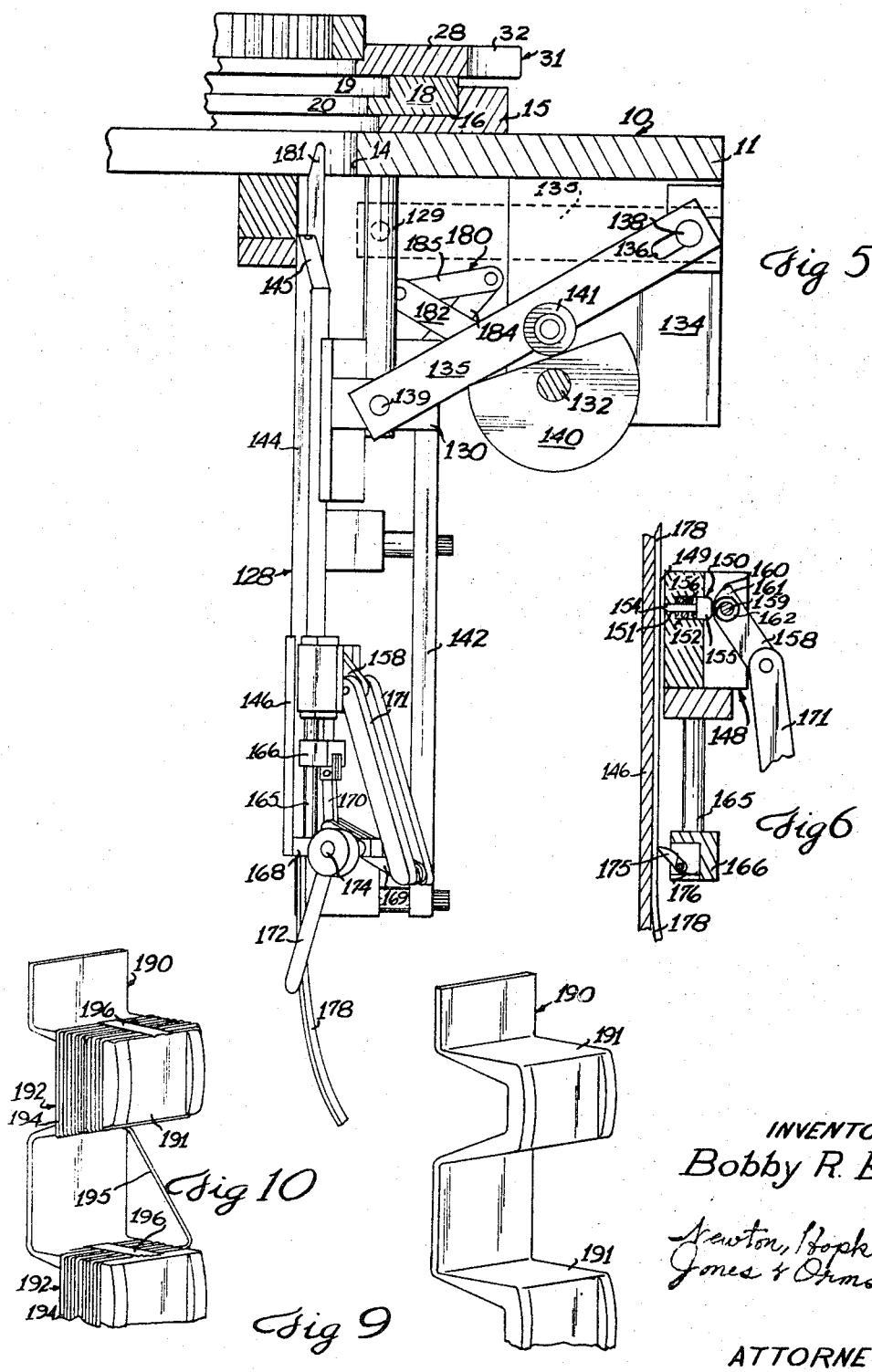
INVENTOR
Bobby R. Ellis
Newton, Hopkins,
Jones & Ormsby
ATTORNEYS

United States Patent Office 3,416,575
Patented Dec. 17, 1968

3,416,575
STATOR COILER
Bobby R. Ellis, 2827 Bolch St.,
Shreveport, La. 71104
Filed Aug. 9, 1966, Ser. No. 571,251
1 Claim. (Cl. 140—92.1)

ABSTRACT OF THE DISCLOSURE

Method and apparatus for inserting preformed wire coils into the slots of the stator of a multi-stage automotive alternator. The method includes the steps of forming a series of spaced coils from a continuous wire, extending said series of coils in the direction disposed parallel to the central axis of said stator, positioning the first coil of the series of coils into juxtaposition with a first pair of a plurality of slots in the stator, inserting the first coil of the series of coils into said first pair of slots in the stator, moving the stator and the series of coils with respect to each other to position the next coil of the series of coils into juxtaposition with the next adjacent pair of slots in the stator, and repeating the process.

Figure 4:
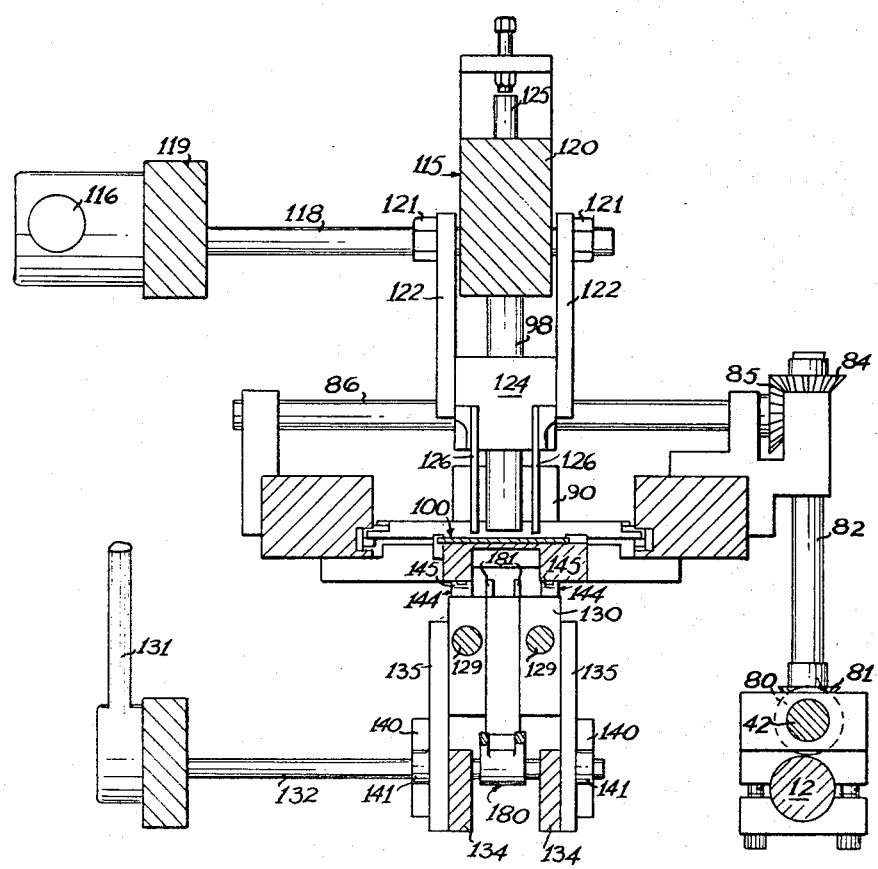

The apparatus includes a form for supporting wire comprising an elongated strip of flexible material including a series of spaced, hollow protrusions extending from one of its sides along its length and wherein a continuous wire is serially wound about said protrusions beginning at the base of the first one of the protrusions and continuing about the first protrusion for several turns and passing serially to and wound about the next adjacent protrusion in a similar manner.

The apparatus also includes means for positioning a coil of a series of pre-wound coils into juxtaposition with a pair of slots in a stator, means for inserting a coil into said pair of slots comprising wedging members movable toward the slots in a direction transverse to the disposition of the series of coils, means for moving the stator and the remaining coils of the series of coils with respect to each other to position the next coil of the series of coils into juxtaposition with another pair of slots in the stator by rotating the stator about its longitudinal axis and by moving the next coil of the series of coils into the plane of the slots in the stator, and means for positioning retaining means into said slots in the stator to retain therein the coils thus positioned in the slots of the stator.

---

This invention relates to a stator coiler, and more particularly to a method and apparatus for inserting coils into the slots of the stator of a multi-stage automotive alternator.

In the past, it has been difficult to wind electric wiring into the slots of the stator of an alternator since the slots of a stator, by necessity, are small and are disposed so that they face inwardly about a small circle. Thus, the workman or machinery inserting the coils in the slots had a small space in which to work, and the coils had to be forced into the slots in order that the small slots would accommodate a large number of coils. The traditional manner in which coils were inserted in slots of alternator stators was by hand and with the use of various hand tools. Later, certain mechanical apparatus was developed which actually wound the coils into predetermined slots of the stator. However, the mechanical apparatus was expensive to manufacture, difficult to operate, required the constant attention of a skilled operator, and was slow in operation.

Accordingly, this invention comprises a method and apparatus for inserting coils into the slots of an alternator stator wherein the coils are wound into an appropriate size, positioned in juxtaposition with appropriate slots of the stator, and then inserted into the slots of the stator. A continuous electric wire conductor is wound about a form in such a manner that a series of coils are formed that are of a size and shape appropriate to fit in the slots of the stator. The form, with the coils wound thereon, is then connected to the stator coiler, and the stator coiler then removes the coils from the form and forces the coils into the slots of the stator. After a series of coils has been inserted into the slots of the stator in this manner, a new form with coils wound thereon is connected to the stator coiler and the operation is repeated with the second series of coils being inserted into slots offset from the slots of the first series of coils. In this manner, the coils can be inserted in the stator so as to create a multi-stage electric stator.

Thus, it is an object of this invention to provide a method of inserting coils into the slots of an alternator stator wherein the series of coils is preformed from a continuous wire and the coils are sequentially inserted into the slots of the stator.

Another object of this invention is to provide a method of inserting coils into the slots of an alternator stator wherein a plurality of coils are formed from a continuous strand of wire by winding the wire about a series of protrusions on a form, the form is positioned in the area enclosed by a circular stator, the coils are sequentially removed from the form inserted into the slots of the stator.

Another object of this invention is to provide an apparatus for inserting coils into the slots of an electric alternator stator which includes a means for inserting a series of preformed coils into predetermined slots of the stator.

Another object of this invention is to provide apparatus for inserting coils into the slots of an electric alternator stator which is economical to manufacture, expedient to use, can be utilized by an unskilled laborer, is efficient in operation, and is well designed to meet the economics of manufacture.

Figure 11:
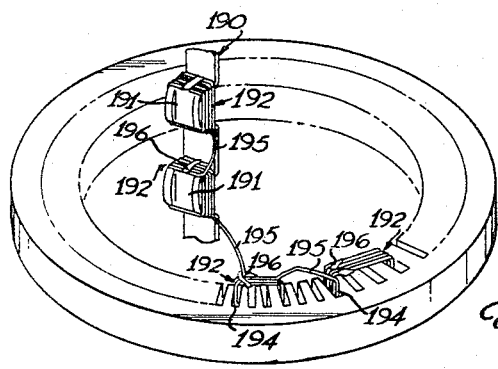

Other objects, features and advantages of the present invention will become apparent upon reading the following disclosure, taken in conjunction with the accompanying drawing, in which:

FIG. 1 is a perspective view of the stator coiler;
FIG. 2 is a top plan view of the stator coiler;
FIG. 3 is a side, elevational view, in cross section of the stator coiler, taken along lines 3—3 of FIG. 2;
FIG. 4 is a partial, top plan view of the stator coiler, taken along lines 4—4 of FIG. 3;
FIG. 5 is a partial side elevational view of the stator coiler, showing the peg inserting the mechanism;
FIG. 6 is a cross sectional view of the peg cutting and inserting apparatus of FIG. 5;
FIG. 7 is a partial perspective view of the coil form holder;
FIG. 8 is a front elevational view, in cross section, of the coil form holder of FIG. 7;
FIG. 9 is a perspective view of the coil form with the coil removed therefrom; and
FIG. 10 is a perspective view of the coil form with the coil present thereon;
FIG. 11 is a perspective view of a stator ring with the first phase of coils partially inserted.

Referring now more particularly to the drawing, in which like numerals indicate like parts throughout the several views, FIG. 1 shows a stator coiler 10 comprising a horizontally disposed platform 11 supported by vertically extending legs from a floor or ground surface (not shown) in the conventional manner. The platform 11 is centrally apertured at 14 (FIG. 3) and a bearing ring 15 is connected to the platform 11, as by screws, or the like.

The bearing ring 15 is concentrically disposed about the central aperture 14 and defines an inner annular groove 16, also concentrically disposed with the central aperture 14. An annular holding ring 18, of a diameter equal to the annular groove 16 of the bearing ring 15, is inserted into the annular groove 16. The annular holding ring is maintained in slidable relationship with the bearing ring 15 and defines an inner annular groove 19 on the upper surface thereof. The annular groove 19 forms an annular projection 20 extending around the inner perimeter of the holding ring 18.

A plurality of holding blocks 21 are connected to the platform 11, from the under side thereof, and extend upwardly through the central aperture 14 of the platform. The holding blocks 21 comprise a lower projection 22 that projects over the bottom surface of the platform 11, a first upwardly extending section 24 that spans across the width of the platform 11, a second upwardly extending section 25 that is offset from the first section 24 and extends to the upper surface of the annular projection 20 of the holding ring 18, and an outwardly extending tab 26 that extends into the inner annular groove 19 of the holding ring 18. With this construction, the holding blocks 21 are rigidly connected to the platform 11 by screws, or the like, extending through the lower projection 22 up into the platform 11, and the second upwardly extending section 25 tends to grip the platform 11. The outer surface of the second upwardly extending section 25 is spaced against the inner surface of the annular projection 20 in such a manner that the annular holding ring 18 is positively held in concentric relationship with the annular groove 16 of the bearing ring 15. Also, the tab 26 projects over the annular projection 20 in such a manner that the annular holding ring 18 cannot be vertically moved from the bearing ring 15 and the holding ring retains its ability to rotate in the annular groove 16 of the bearing ring 15.

A stator gripping ring 28 is rigidly connected to the annular holding ring 18 by screws 29. Thus, the stator gripping ring 28 is adapted to rotate with the holding ring 18. The stator gripping ring 28 is centrally apertured and is annular in shape. The inner perimeter 27 of the stator gripping ring 28 defines an upper annular groove or stator holding groove 30, into which the stator is to be inserted. The outer perimeter 31 of the stator gripping ring 28 is formed with a series of teeth 32.

Mounted on the upper surface of the stator gripping ring 28, on diametrically opposed sides thereof, are stator gripping cams 34. The stator gripping cams 34 are connected to the gripping ring 28 by means of screw 35. The head of the screw 35 is displaced above the upper surface of the gripping ring 28 so as to confine the gripping cam 34 and its spring 36 therebelow. The spring 36 normally positions the gripping cam 35 toward the cap of the screw 36. The gripping cam 34 varies in thickness around its circumference in such a manner that when a stator is inserted into the upper annular groove or stator holding groove 30 of the stator gripping ring 38, the stator gripping cams 34 can be rotated about their screws 35 so that the tapered lower surface of the stator gripping cams 34 engage the upper surface of the stator to firmly hold it on the stator gripping ring 28.

Also connected to the stator gripping ring 28 is a plurality of stator positioning elements 38. Each stator gripping element 38 includes a cam (not shown), a cam actuator 39, and a movable abutment element 40. Manipulation of the cam actuator 39 causes the cam to move the abutment element 40 in toward the center of the central opening of the platform 11, bearing ring 15, holding ring 18 and gripping ring 28. While the majority of stators presently utilized in electric alternators include a small groove on their outer perimeter, stators can be inserted into the annular groove or stator holding groove 30 of the stator gripping ring, rotated until its groove is positioned adjacent one of the stator gripping elements 38, and then held in position by the abutment element 40 of the stator gripping element being inserted into the groove. Since there are three stator gripping elements 38 disposed in side by side relationship on the stator gripping ring 28, stators can be inserted in three positions on the stator gripping ring 28.

Annular holding ring 18 and stator gripping ring 28 are rotated about the platform 11 by means of the stator rotating linkage 41. As is best shown in FIGS. 1 and 2, the stator rotating linkage 41 comprises an axle 42 extending through the platform 11, a cam 44 rotatable with the axle 42, hand lever 45 connected to the cam 44 for rotating the cam and axle 42. Connected to the axle 42 is a lever arm 46, which extends from the axle 42 in a direction opposite from the hand lever 45. An intermediate link 48 is connected at one of its ends to the lever arm 46, and at the other of its ends to the ratchet 49. A ratchet guide assembly 50 is disposed about the stator gripping ring 28 and guides the ratchet 49 through an arc of approximately 90°. The ratchet guide assembly 50 includes an arcuate guide bar 51 which is rigidly attached to the platform 11 and surrounds a portion of bearing ring 15. Guide bar 51 includes an arcuate groove 52 on the inner edge of its lower surface whereby the upper portion of the guide bar 51 forms an overhanging flange 54. Ratchet 49 is connected to a ratchet guide block 55 which is positioned between the guide bar 51 and the bearing ring 15. A pair of roller bearings 56 are attached to each end of a guide block 55, and the roller bearings 56 are sized so that they fit beneath the overhanging flange 54, into the arcuate groove 52 of a guide bar 51, and beneath the teeth 32 of the stator gripping ring 28, against bearing ring 15.

The ratchet 49 is pivotally connected to the pivot pin 58 which extends upwardly from the ratchet guide block 55. The ratchet 49 and the intermediate link 48 are connected to each other by the pivot pin 59.

With the above arrangement, when the hand lever 45 is moved in the direction as indicated by arrow 60, the ratchet 49 will engage one of the teeth 32 of the stator gripping ring 28, and cause it to rotate in a counterclockwise direction. When the hand lever is rotated in the direction as indicated by arrow 61, the ratchet 49 will pivot about its pivot pin 58 so that it does not engage the teeth 32 of the stator gripping ring 28 and will move in a clockwise direction, as guided by the ratchet guide assembly 50. Limiting pin 62 is connected to the ratchet guide block 55 to insure that the ratchet 49 will not pivot so that pivot pin 59 is positioned on the opposite side of pivot pin 58 from intermediate link 48.

Stator gripping ring locking apparatus 64 is positioned adjacent the cam 44 of the stator rotating linkage 41. The stator gripping ring locking apparatus 64 includes a channel 65 extending toward the teeth 32 of the stator gripping ring 28 which is defined by a pair of upwardly extending walls 66 connected to the platform 11 and a retaining cover 68 connected to said wall 66. A locking element 69 is loosely positioned in the channel 65 and includes roller bearings 70 and 71 connected to each other by means of link 72. When the hand lever 45 is rotated in the direction as indicated by arrow 61, the protrusion 74 engages bearing 70 and urges bearing 71 into engagement with the teeth 32 of the stator gripping ring 28. Since the bearing 71 is round, it will direct itself into space between adjacent teeth 32 of the gripping ring 28, even if such a space is initially not juxtaposed the stator gripping ring locking apparatus 64 upon initial movement of the hand lever 45. Thus, this construction insures that the stator gripping ring 28 and the stator carried thereby will always be precisely positioned on the stator coiler 10 when the protrusion 74 of the cam 44 engages the locking apparatus 64. When the hand lever 45 is rotated in a counterclockwise direction, as indicated by the arrow 60, the protrusion 74 will be moved out of engagement with roller bearing 70 and the roller bearing 71 will be free to move away from the teeth 32 of the stator gripping ring 28. As previously described, movement of the hand lever in this direction causes ratchet 49 to engage the teeth 32 of the stator gripping ring 28 to rotate the stator gripping ring. Rotation of the stator gripping ring tends to move the roller bearing 71 away from the teeth 32 so the stator gripping ring is no longer locked by the locking apparatus 64.

Adjusting screws 74 are connected to the platform 11 by means of upwardly extending projections 75. The adjusting screws 74 are positioned on either side of the cam 44 and are arranged to abut hand lever 45 at the limits of its rotation. Thus, the length of movement of the hand lever 45 is determined by the adjustment of adjusting screws 74. Lever arm 46 of the stator rotating linkage 41 includes a pair of adjusting screws 76 located on either side of the axle 42. Projections 78 extend upwardly from cam 44 in the vicinity of adjusting screws 76, and the adjusting screws are rotated to abut the projections 78. By manipulation of the adjusting screws 76 against the projections 78, the position of the lever arm 46 with relation to the hand lever 45 can be adjusted. Adjustment of the lever arm 46 in this manner also adjusts the position of the ratchet 49 and ratchet guide block 55 in the ratchet guide assembly 50. This insures that the ratchet 49 will engage the proper tooth of the series of teeth 32 of the stator gripping ring 28 when the hand lever 45 begins its counter clockwise movement after having been in engagement with the adjusting screw 74.

Referring now to FIG. 1, the axle 42 of the stator rotating linkage 41 extends below the platform 11 and a beveled gear 80 is connected to its lower end. The beveled gear 80 meshes with a second beveled gear 81 (FIG. 4) which is connected to a shaft 82 extending in a horizontal plane, below the platform 11. A third beveled gear 84 is connected to the other end of shaft 82, and a fourth beveled gear 85 meshes with beveled gear 84. Beveled gear 85 is, in turn, connected to horizontally disposed shaft 86 which extends in a direction disposed perpendicular to the shaft 82, toward the center of the stator coiler 10. Shaft 86 has connected intermediate its ends the gear 88 (FIG. 3) which acts as a pinion for rack assembly 89. Rack assembly 89 is mounted on suitable bearings (not shown) so that it moves only in a vertical direction. The rack assembly 89 includes a block 90 and a pin 91 extending in a horizontal direction therethrough. The pin 91 includes an aperture 92 extending therethrough with a sloped surface 94. A cam element 95 extends through the aperture of the pin 91 and includes a sloped surface 96 that corresponds to the sloped surface of the aperture 92. The pin 95 extends upwardly through the block 90 and extends beyond the upper surface of the block 90 so that it will engage the wedge bearing 98 when the block 90 has been moved to the upper limit of its movement. When the pin 95 engages the wedge bearing 98, the sloped surface 96 of pin 95 engages the sloped surface 94 of the pin 91 so as to move the pin 91 against the bias of its spring 99, away from the coil form retainer 100.

The coil form retainer 100 comprises a vertically extending plate 101 (FIGS. 1, 3, 7 and 8) which extends through the central aperture of the platform 11. The coil form retainer includes a series of notches 102 extending at spaced intervals along its length and positioned to engage the pin 91 of the rack assembly 89. Since the end of the pin 91 is tapered, as shown at 103 in FIG. 3, the coil form retainer 101 can be moved in a downward direction relative to the rack assembly 89 by manual manipulation, but movement thereof is prohibited in the upward direction by the pin 91, unless pin 95 is depressed by the wedge bearing 98, as previously described. Disposed on the side of the coil form retainer 100 remote from the notches 102 are a series of expandable protrusions 105. The protrusions 105 each include a stationary block 106 rigidly connected to the coil form retainer 100 and a movable block 107 adapted to move vertically of the coil form retainer 100. As is shown in FIG. 8, a pair of cap screws 108 are threadedly engaged with the stationary block 106, the cap screws 108 extending through the movable block 107 through its bores 109 and counter bores 110. The cap of the cap screws 108 are sized to fit in the counter bores 110 while the shank of the screws are sized to fit in the bores 109 of the movable block 107. Coil springs are disposed about the shank of cap screws 108, between the stationary block 106 and the movable block 107 so as to urge the movable block against the cap of the cap screws 108, away from the stationary block 106.

Slots 111 are defined on each side of the expandable protrusions 105 in the coil form retainer 100. Slots 111 are of a length larger than the height of each protrusion 105.

Wedging assembly 115 is connected to the lower surface of platform 11 for the purpose of wedging the coils onto the stator. As is shown in FIGS. 1, 2, and 4, wedging assembly 115 includes an upwardly extending hand lever 116 which is connected to a horizontally disposed shaft 118 through a bearing block 119. The horizontally disposed shaft 118 extends into another bearing block 120 (FIGS. 3 and 4) and a pair of rocker arms 121 are connected thereto on either side of bearing block 120. The rocker arms 121 extend upwardly from the shaft 118 and are pivotally connected to follower arms 122 which extend in a horizontal direction, toward the coil form retainer 100. Follower arms 122 are connected to a wedge block 124 which is slidably received on wedge bearing 98. A guide bar 125 is rigidly connected to wedge block 124, and slidably received in the bearing block 120. The guide bar 125 and wedge bearing 98 cooperate with each other to maintain the wedge block 124 in accurate upright sliding relationship with the wedge bearing 98.

A pair of wedge fins 126 are supported by the wedge block 24. Wedge fins 126 are spaced apart a distance equal to the spacing of the slots 111 of the coil form retainer 100 in such a manner that, when the coil form retainer 100 is in proper alignment with the wedge fins 126, the hand lever 116 can be manipulated to rotate shaft 118 through bearing block 120, move rocker arms 121 in a counter clockwise direction (FIG. 3) to move follower arms 122 to the left, wedge block 124 to the left, and wedge fins 126 to the left, until they extend through the slots 111, beyond the expandable protrusion 105 between the slots 111.

As is best shown in FIGS. 1, 3, 4 and 5, a peg cutting and insertion mechanism is attached to the underside of platform 11, in juxtaposition with the coil form retainer 100. A pair of slide bars 129 depend from platform 111 and a bearing block is slidably positioned thereon. The bearing block 130 is free to slide in a vertical direction over the slide bars 129. Hand lever 131 is positioned outwardly of the platform 11 and is connected to horizontally extending shaft 132 that is below the platform 11. Shaft 132 is rotatably received in a pair of bearing blocks 134 which are rigidly connected to the underside of platform 11. Bearing blocks 132 each have slidably connected thereto links 135 (see FIG. 4). Links 135 have elongate slots 136 which receive connecting pins 138 connected to bearing blocks 134. The other end of links 135 are connected by means of connecting pins 139 to bearing block 130 of the peg cutting and insertion mechanism 128. A pair of cams 140 are connected to shaft 132, a cam being positioned on each side of the bearing blocks 134. A cam follower 141 is connected to the midpoint of each of the links 135, in juxtaposition with cams 140. With this construction, when the hand lever 131 is rotated, shaft 132 rotates cams 140, which moves cam followers 141 in an upward direction. This causes links 135 to slidably pivot about pins 138 in such a manner that the bearing block 130 is moved in an upward direction. Of course, movement of the hand lever 131 in the opposite direction causes the bearing block 130 to move in a downward direction.

Peg cutting and insertion mechanism 128 is connected to bearing block 130 and adapted to reciprocate in a vertical direction therewith by means of downwardly extending support arm 142. A pair of peg channels 144 are vertically disposed and spaced apart a distance equal to the spacing of the slots 111 in the coil form retainer 100. The channels 144 extend toward the platform 11 and are movable in an upward direction until their tapered end portions 145 are positioned immediately below the upper surface of the stator gripping ring 28.

Disposed below the channels 144 are a pair of cutting mechanisms 146; one cutting mechanism 146 being provided for each channel 144. The cutting mechanism 146 comprises a housing 148 connected to channel 144 which includes a vertically extending through bore 149 of a size and shape equal to the interior portion of the channel 144 (not shown). A spring biased cutting pin 150 is disposed in a bore 151 and counter bore 152 which interesect the through bore 149. The cutting pin 150 is formed with a sharpened end 154 adjacent the through bore 149 and with a rounded head at its other end. A spring 156 is positioned in the counter bore 152 and engages the underside of the rounded head 155 to bias the cutting end 154 of the cutting pin 150 away from the through bore 149. A cam lever 158 is pivotally connected by pivot pin 159 to the housing 148 and adapted to engage the rounded head 155 of the cutting pin 150, to urge the cutting pin 150 into the through bore 149. The cam surface 160 of the cam lever 158 terminates in a tapered portion 161 that allows the cam lever to slide axially of the pin 159, off of the rounded head 155 of the cutting pin 150. A spring 162 is disposed about pivot pin 159, between a surface of the housing 148 and the cam lever 158, to normally engage the cam lever into the vicinity of the rounded head 155 of the cutting pin 150. When the cam lever 158 is moved so that it is horizontally disposed, the cutting pin 150 will have been pressed against the bias of its spring 156 and the tapered surface 161 of the cam lever will have urged the cam lever to one side of the cutting pin, thereby allowing the spring 156 to urge the cutting pin away from the through bore 149. Of course, when the cam lever 158 is pivoted back to the position shown in FIG. 6, its cam surface will be withdrawn from the cutting pin 150 and the spring 162 will urge the cam lever 158 back to its engagement position.

A pair of slide bars 165 is connected to the housing 148 of the cutting mechanism 146. A slide block 166 is slidably positioned over the slide bars 156 and adapted to reciprocate thereon. A horizontal support 168 is connected to the lower end of each of the slide bars 165 and a pivotal link 169 is connected at its midpoint to the horizontal support 168. The pivotal link 169 is connected at one end to a follower link 170 which is connected, in turn, to slide block 166. The other end of pivotal link 169 is connected to follower links 171, which are, in turn, connected to cam lever 158. Hand lever 172 is rigidly connected to pivotal link 169 by means of shaft 174, so that rotation of the hand lever 172 causes the slide block 166 to reciprocate over the slide bars 165, and the cam lever 158 to pivot about its pivot pin 159. A ratchet assembly 175 is connected to slide block 166 and spring biased in a counter clockwise direction (FIG. 6) by spring means 176. A continuous strip of pegging material 178 extends through each of the cutting mechanisms 146 and channels 144 of the peg cutting and insertion mechanism 128. The ratchet 175 of the slide block 166 engages the pegging material 178 to prevent downward movement thereof, and to cause the pegging material to move in an upward direction when the slide block 166 is caused to move in an upward direction, as previously described. The cutting pin 150 of the cutting mechanism 146 engages the pegging material 178 and cuts the same into pegs of predetermined lengths, as determined by the extent of vertical movement of the slide block 166. After the pegging material 178 is cut into separate pegs by the cutting pin 150, further movement of the slide block 166 causes the pegs to move through the channels 144 so as to be inserted into the slots of the stator, as will be hereinafter described.

Referring now to FIG. 3, linkage mechanism 180 is connected between shaft 132 and wedging cams 181 (FIG. 5) of slide block 130. Link 182 is rigidly connected to shaft 132 so as to rotate therewith, while link 184 is connected, through slide block 130, to wedging cams 181. When link 182 is pivoted in a clockwise direction (FIG. 5) link 185, 184 and 182 will be disposed in substantially aligned relationship, and another link (not shown) disposed in slide block 130 causes wedging cams 181 to move to the right (FIG. 5) to wedge the coils into the slots of the stator (not shown).

A plurality of coils forms or mandrels 190 are provided (FIGS. 9 and 10) for mounting on the coil form retainer 100. Coil forms 190 comprise an elongate plastic strip that has a series of undulations therein that form a series of protrusions 191. The protrusions 191 are substantially rectangular in configuration and coils 192 are wound about each protrusion. The coils 192 are formed from a continuous single piece of wire, and the wire 194 is wound about each protrusion in a manner as shown in FIG. 10. The wire 194 is wound from the inside of each protrusion 191 toward the outside thereof, and the outside portion of each coil is connected to the adjacent coil at its inside portion by a free length 195 of wire. While the coil forms 190 are substantially flexible, it may be necessary to attach the wire to the forms by means of a strip of tape 196, or other adhesive material, such as spray, or liquid glue.

The coil forms 190 are sized and shaped to fit over the coil form retainer 100 so that the coils 192 surround the expandable protrusions 105 of the coil form retainer 100.

OPERATION

When it is desired to insert a series of coils into the slots of an electric alternator stator, the stator is inserted into the upper annular groove or stator holding groove 30 of the stator gripping ring 28 of the stator coiler, rotated until the groove in the periphery of the stator coincides with one of the abutment elements 40 of the stator gripping element 38, whereupon cam actuator 39 is rotated to move the abutment element 40 into the groove of the stator. Stator gripping cams 34 are then rotated so that the stator is rigidly held in the groove 30 of the stator gripping ring 28. A coil form 190 having coils 192 wound thereabout (FIG. 10) is then placed on the coil form retainer 100 by placing each of the protrusions 191 on the coil form 190 over the corresponding expandable protrusions 105 of the coil form retainer 100. Since the expandable protrusions 105 can contract against the bias of their springs 109, the coil forms 190 can be wedged onto the coil form retainer 100. The coil forms 190 are retained on the individual expandable protrusions 105 by means of a sharpened knife edge protrusion 103 extending from the side surfaces of each of the blocks 106 and 107 of the expandable protrusions 105. After the coil forms 190 have been positioned on the coil form retainer 100 in this manner, the coil form retainer 100 is moved in a downward direction until the pin 96 engages the first one of the notches 102 of the rear surface of the coil form retainer 100, whereupon the lowermost protrusion 105 of the coil form retainer 100 and the coil 192 disposed thereabout will be in juxtaposition with the slots of the stator.

After the stator coiler has been arranged in this manner, hand lever 45 will be positioned so that the protrusion 74 of the cam 44 engages the stator gripping ring locking apparatus to lock the stator gripping ring 28 in a predetermined position. Hand lever 116 is then rotated to rotate shaft 118, rocker arm 121, move follower arm 122 to the left (FIG. 3), move wedge block 124 to the left over wedge bearing 98, and cause wedge fins 126 to pass through slots 111 disposed on either side of the first protrusion 105. Movement of the wedge fins 126 in this manner causes them to engage the vertically extending portions of the coils disposed about the expandable protrusions 105 of the coil form retainer, thereby moving the coil from this protrusion into the slots of the stator. It should be noted that the free portion 195 of the wire extending between the adjacent coils is sufficient to allow this movement without destruction of the adjacent coils. After the coil has been wedged into the slots by the wedging fins 126, the hand lever 116 is pivoted back to its original position, thereby withdrawing the wedge fins 126 from the slots 111 of the coil form retainer 100. Hand lever 131 is then pivoted to elevate the peg cutting and insertion mechanism 128 (FIG. 5), and to elevate wedging cams 181 into the vicinity of the horizontally extending portions of the coil that was inserted into the slots of the stator. After the peg cutting and insertion mechanism 128 has been elevated, further movement of the hand lever 13, through linkage 180, causes wedging cams 181 to move into the intermediate slots of the stator, to force the coil into the deepest portion of the slots. With the peg cutting and insertion mechanism in this position, hand levers 172 can be manipulated to first cut a portion of the continuous length of pegging material 178, and then elevate the pegging material so that a previously cut peg is inserted in the stator slots, behind the vertically extending portions of the coil. Lever 131 is then moved in the opposite direction to lower the peg cutting and insertion mechanism 138.

Hand lever 45 is then rotated in a counter clockwise direction, as indicated by arrow 60, so that ratchet 49 engages one of the teeth 32 of the stator gripping ring 28, thereby rotating the stator gripping ring and the stator in a counterclockwise direction (FIG. 2), through an arc of 60 degrees. After the stator has been located in this manner, the lever 45 is moved in a clockwise direction to its opposite position so that the protrusion 74 of the cam 44 rocks the stator gripping ring 20, whereupon the operation is repeated. As the hand lever 45 is moved in its clockwise direction, axle 42, extending below the platform 11, causes shafts 82 and 86 to rotate, thereby causing pinion 88 to rotate and move rack assembly 89. Movement of hand lever 45 in this direction (as indicated by arrow 61) causes the rack assembly 89 to move in a downward direction, whereby pin 91 engages the lowermost notch 102 of the coil form retainer 100, causing the coil form retainer to move downwardly therewith. When the hand lever 45 reaches the end of its stroke, the rack assembly 89 and coil form retainer 100 will have been moved a distance sufficient to place the next coil of the coil form in juxtaposition with the slots of the stator.

It should be noted that when the hand lever 45 is moved in a counter clockwise direction (as indicated by arrow 60), and the ratchet 49 rotates the stator gripping ring 28, the coil previously inserted into the slots of the stator will move with the stator, laterally of the coil form. The free segment 195 of the wire 192 is of sufficient length to allow the coil inserted onto the stator to move, in the lateral direction without destruction of the coil present on the stator or the coil remaining on the next adjacent protrusion of the coil form retainer. As is shown in FIG. 11, when the next adjacent coil is moved downwardly into a position to be finally mounted on the stator, the free portion of the wire 195 is caught by a guide rail 197 and guided up the bottom side of the coil form to actually become part of the coil. The free wire 195 is of a predetermined length to allow the friction of the guide rail to pull the wire from where it is being held on the previously wound coil by rupturing the length of tape 196. The result is that one-fourth of a coil is removed from the previously inserted coil while one-fourth of a coil is added to the coil being inserted while still maintaining a sufficient length of free wire to connect the adjacent coils. This procedure shows a method by which a continuous series of coils can be inserted into the slots of a stator wherein the coils are fed to the stator along a path disposed substantially parallel to the central axis of the stator.

After all of the coils have been removed from the coil form and inserted into the slots of the stator and the hand lever rotated to move the block 90 of the rack assembly 89 (FIG. 3) to its upper position, the pin 95 will abut the wedge bearing 98 so that the pin 91 is withdrawn from the notches 102 of the coil form retainer 100, and the coil form retainer can be elevated manually to expose all of the expandable protrusions 105 thereon. The coil form 190 is then removed from the coil form retainer 100, and a new coil form with coils positioned thereon will be positioned on the coil form retainer 100. The stator will then be rotated in the stator gripping ring 28 by withdrawing the abutment element 40 of one of the stator gripping elements 38, and rotating the stator so that its grooves will coincide with the abutment element of another one of the stator gripping elements 38. The stator is then locked into position, as previously described, and the stator gripping ring 28 is then put in its predetermined starting position, whereupon the previous operation is repeated. Since the stator has been rotated in the stator gripping ring 28, the coil will be inserted into slots offset from those into which coils have been previously inserted, whereupon the second stage windings of a multistage stator will be inserted into the stator. Of course, a third series of coils can be inserted in a similar manner to create a three-stage stator for a three-stage alternator.

While the peg cutting and insertion mechanism (FIG. 5) must be elevated each time it is desired to force the wedging cams 181 into the intermediate slots between the vertically extending portions of a coil, the hand levers 172 do not have to be manipulated and no pegs have to be inserted into the slots. Thus, the initial series of coils can be inserted into the slots of the stator without pegs, whereupon the subsequent coil will be inserted into adjacent slots, and since the coils will overlap each other, the later inserted coils will tend to hold the first inserted coils into the depths of their slots. Thus, pegs need only be inserted into the slots occupied by the last two of the series of coils. This, of course, obviates the necessity of pegging every slot of the stator.

At this point, it can be seen that an expedient method and apparatus is provided for inserting coils into the slots of an alternator stator. The procedure is easily carried out by an unskilled, or at the most, a semi-skilled laborer, and with a relatively simple, operated machine.

It will be obvious to those skilled in the art that many variations may be made in the embodiments chosen for the purpose of illustrating the present invention without departing from the scope thereof as defined by the appended claims.

What is claimed as my invention is:

1. A method of inserting coils into the slots of an electric alternator stator comprising
    forming a series of spaced coils from a continuous wire,
    extending the series of coils in a direction disposed parallel to the central axis of said stator,
    positioning the first of the series of the coils into juxtaposition with a first plurality of slots of the stator,
    inserting the first of the series of coils into the first plurality of slots of the stator,
    moving the stator and the series of coils with respect to each other to position the next coil of the series of coils into juxtaposition with a next adjacent plurality of slots of the stator, and
    repeating the process.

(References on following page)

References Cited

UNITED STATES PATENTS

| | | | |
|---|---|---|---|
| 2,388,598 | 11/1945 | Cahill | 140—92.2 |
| 2,575,705 | 11/1951 | Clokey | 29—606 |
| 3,230,611 | 1/1966 | Moore | 140—92.1 |
| 3,331,403 | 7/1967 | De Young | 140—92.1 |

CHARLES W. LANHAM, *Primary Examiner.*

L. A. LARSON, *Assistant Exmainer.*

U.S. Cl. X.R.

140—93; 29—606, 205